(12) United States Patent
Powell (10) Patent No.: US 10,845,508 B2
(45) Date of Patent: Nov. 24, 2020

(54) OPTICAL STACK INCLUDING EMBEDDED DIFFUSE SURFACE

(71) Applicant: Microsoft Technology Licensing, LLC, Redmond, WA (US)

(72) Inventor: Karlton David Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 15/994,204

(22) Filed: May 31, 2018

(65) Prior Publication Data

US 2019/0369306 A1 Dec. 5, 2019

(51) Int. Cl.
 *G02B 1/115* (2015.01)
 *G02B 5/02* (2006.01)
 (Continued)

(52) U.S. Cl.
 CPC ............ *G02B 5/021* (2013.01); *G01J 1/0488* (2013.01); *G02B 1/11* (2013.01); *G06K 9/00288* (2013.01)

(58) Field of Classification Search
 CPC ........ G02B 5/208; G02B 1/115; G02B 13/14; G02B 26/001; G02B 27/142; G02B 5/20;
 (Continued)

(56) References Cited

U.S. PATENT DOCUMENTS

| 5,688,608 A | 11/1997 | Tsai et al. |
| 6,368,699 B1 * | 4/2002 | Gilbert .................... B32B 27/36 428/212 |

(Continued)

FOREIGN PATENT DOCUMENTS

| CN | 103792599 A | 5/2014 |
| JP | 2003004526 A | 1/2003 |
| JP | 2013065052 A | 4/2013 |

OTHER PUBLICATIONS

"High Performance Thin Film Optical Coatings Technical Capabilities", Retrieved from: https://web.archive.org/web/20130814015200/http:/abrisatechnologies.com/docs/Thin%20Film%20Coatings%20Technical%20Brochure.pdf, Aug. 14, 2013, 32 Pages.

(Continued)

*Primary Examiner* — Balram T Parbadia
(74) *Attorney, Agent, or Firm* — Alleman Hall Creasman & Tuttle LLP (57) ABSTRACT

An optical system comprises an optical sensor configured to receive light within one or more bandwidths of interest and an optical stack placed optically in front of the optical sensor. The optical stack comprises a polymeric layer optically transparent to at least the one or more bandwidths of interest, and a matching index layer positioned optically in front of the polymeric layer, the matching index layer and polymeric layer having refractive indexes within a threshold similarity. The optical stack further includes a bumpy diffuse surface embedded between the polymeric layer and the matching index layer, and a partially reflective layer positioned in between the bumpy diffuse surface and the matching index layer, the partially reflective layer configured to at least partially reflect at least some wavelengths outside the one or more bandwidths of interest.

17 Claims, 6 Drawing Sheets

(51) Int. Cl.
*G01J 1/04* (2006.01)
*G02B 1/11* (2015.01)
*G06K 9/00* (2006.01)

(58) Field of Classification Search
CPC ... G02B 5/281; G02B 5/288; G02F 1/133555; G02F 1/13473; G02F 2203/58; H01L 31/02168
See application file for complete search history.

(56) References Cited

U.S. PATENT DOCUMENTS

| | | | | |
|---|---|---|---|---|
| 6,737,154 | B2* | 5/2004 | Jonza | B32B 27/08 |
| | | | | 264/284 |
| 6,997,981 | B1* | 2/2006 | Coombs | G02B 5/0816 |
| | | | | 106/415 |
| 9,570,490 | B2 | 2/2017 | Kakiuchi et al. | |
| 9,864,116 | B2 | 1/2018 | Matsuyuki et al. | |
| 9,864,119 | B2* | 1/2018 | Powell | G02B 5/208 |
| 10,466,395 | B1* | 11/2019 | Northcott | G02B 1/04 |
| 2007/0024958 | A1 | 2/2007 | Choi et al. | |
| 2008/0316594 | A1* | 12/2008 | Hashiguchi | G02B 5/281 |
| | | | | 359/359 |
| 2012/0129579 | A1* | 5/2012 | Tam | G01J 5/0025 |
| | | | | 455/575.1 |
| 2012/0145901 | A1* | 6/2012 | Kakiuchi | G02B 5/208 |
| | | | | 250/330 |
| 2013/0063810 | A1* | 3/2013 | Miyaguchi | G02B 5/281 |
| | | | | 359/359 |
| 2013/0273317 | A1* | 10/2013 | Nakayama | C09D 1/00 |
| | | | | 428/141 |
| 2015/0192717 | A1* | 7/2015 | Katagiri | G02B 5/26 |
| | | | | 359/359 |
| 2016/0064577 | A1* | 3/2016 | Ballif | H01L 31/02167 |
| | | | | 136/257 |
| 2017/0140221 | A1 | 5/2017 | Ollila et al. | |
| 2017/0184764 | A1* | 6/2017 | Matsuyuki | G02B 5/208 |
| 2017/0318239 | A1 | 11/2017 | Miyasaka | |

OTHER PUBLICATIONS

"Thin Film Coatings: Custom", Retrieved from: https://web.archive.org/web/20121112204430/http:/www.reynardcorp.com/optical-production-capabilities/thin-film-coatings-custom.html, Nov. 12, 2012, 3 Pages.

Yokogawa et al., "IR sensitivity enhancement of CMOS Image Sensor with diffractive light trapping pixels", In Journal of Scientific Reports, vol. 7, Jun. 19, 2017, pp. 1-9.

"International Search Report and Written Opinion Issued in PCT Application No. PCT/US19/032342", dated Aug. 28, 2019, 12 Pages.

* cited by examiner

OPTICAL STACK INCLUDING EMBEDDED DIFFUSE SURFACE

BACKGROUND

Imaging devices may emit and receive structured, including both uniform and non-uniform, infrared light to determine depth maps, to recognize gestures for natural user interface applications, for facial recognition applications, retinal scanning, etc. An external window may be used to protect the imaging sensors and to filter out undesirable wavelengths of light which may impact the performance of the imaging device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An optical system comprises an optical sensor configured to receive light within one or more bandwidths of interest and an optical stack placed optically in front of the optical sensor. The optical stack comprises a polymeric layer configured to be optically transparent to at least the one or more bandwidths of interest, and a matching index layer positioned optically in front of the polymeric layer, the matching index layer and polymeric layer having refractive indexes within a threshold similarity. The optical stack further includes a bumpy diffuse surface embedded between the polymeric layer and the matching index layer, and a partially reflective layer positioned in between the bumpy diffuse surface and the matching index layer, the partially reflective layer configured to at least partially reflect at least some wavelengths outside the one or more bandwidths of interest. The optical stack transmits light within the one or more bandwidths of interest, and diffusely reflects ambient light, allowing the generation of customizable cover windows for the optical sensor.

DETAILED DESCRIPTION

Many computing devices include machine vision systems that may provide input to various algorithms. Such imaging devices may output spatially structured and/or temporally structured infrared light, and receive infrared light reflected off objects in an environment. Increasingly, consumer devices such as laptops, digital home assistants, and gaming devices include such imaging devices. The received light may be used to generate depth maps, recognize gestures for natural user interface applications, gather biometrics, perform body and/or face detection, facial recognition, retinal scanning, etc. The imaging system may be hidden behind an IR transmissive window in order to protect the optical sensors, and in some examples to improve the performance of the optical sensors, such as by filtering out ambient light.

Figure 1:
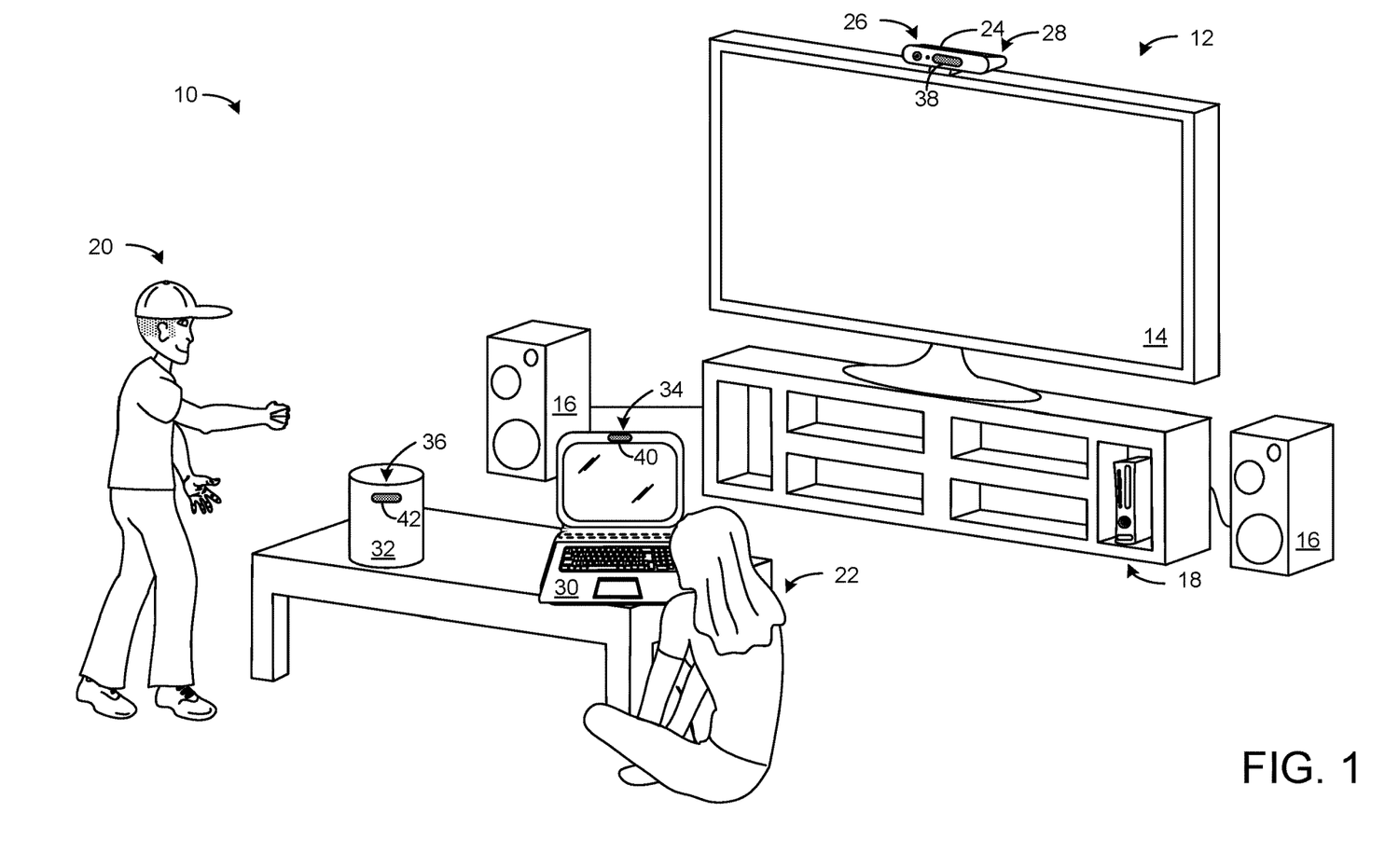
FIG. 1 shows an example use environment for computing devices having machine vision systems.

FIG. 1 shows aspects of an example use environment 10. The illustrated use environment is a living room or family room of a personal residence. However, the systems and devices described herein are equally applicable in other environments, such as business environments, retail stores and kiosks, restaurants, information and public-service kiosks, etc. The environment of FIG. 1 features a home-entertainment system 12. The home-entertainment system includes a large-format display 14, and loudspeakers 16, both operatively coupled to computer system 18.

In some examples, computer system 18 may be a video-game system. In some examples, computer system 18 may be a multimedia system configured to play music and/or video. In some examples, computer system 18 may be a general-purpose computer system used for internet browsing and productivity applications—word processing and spread-sheet applications, for example. In general, computer system 18 may be configured for any or all of the above purposes, among others, without departing from the scope of this disclosure.

Computer system 18 is configured to accept various forms of user input from one or more users (e.g., first user 20, second user 22) via user input system 24. As such, traditional user-input devices such as a keyboard, mouse, touch-screen, gamepad, or joystick controller (not shown in the drawings) may be operatively coupled to the computer system. Regardless of whether traditional user-input modalities are supported, user input system 24 may also be configured to mediate so-called natural user input (NUI) and/or voice user input (VUI) from at least one user.

To mediate user input from the one or more users, user input system 24 is useable by computer system 18. The user input subsystem is configured to capture various aspects of user input and provide corresponding actionable input to the computer system. To this end, the user input subsystem may receive low-level input from peripheral sensory components, which may include machine vision subsystem 26 and listening subsystem 28. In the illustrated example, machine vision subsystem 26 and listening subsystem 28 share a common enclosure; in other examples, they may be separate components.

FIG. 1 depicts second user 22 interacting with laptop computing system 30. Use environment 10 further includes digital home assistant 32. Both laptop computing system 30 and digital home assistant 32 may be communicatively coupled to computer system 18, as well as to large format display 14, loudspeakers 16, input system 24, and/or other devices that are not shown (e.g., additional computing devices, cell phones, tablet computers, digitally enabled home devices).

Laptop computing system 30 features user input system 34, and digital home assistant 32 features user input system 36. As per user input system 24, user input systems 34 and 36 may each include a vision subsystem and a listening subsystem. In this example, user input systems 24, 34, and 36 each include an IR imaging system, such as a depth camera, which may enable computer system 18, laptop computing system 30, and digital home assistant 32 to generate depth images of use environment 10, to recognize NUI gestures, to detect bodies, to detect faces, to recognize facial features and expressions, etc.

Each IR imaging system includes one or more optical sensors. In some examples, the IR imaging systems may further include one or more optical sources, each optical source configured to output light within a band of infrared wavelengths. Each optical sensor may thus be configured to receive and/or recognize light within the band of infrared wavelengths emitted by their respective optical source. In some examples, the IR output light may be emitted as structured light. In other examples, the IR output light may be emitted as uniform, or "flood", light over a field of illumination.

To mask the imaging system, and to filter out ambient light from the optical sensor, each IR imaging system may include an IR window, depicted in FIG. 1 as a dark band. IR window 38 is positioned on the outer surface of user input system 24, IR window 40 is positioned on a bezel of laptop computing system 30, and IR window 42 is positioned on an outer face of digital home assistant 32. IR windows 38 and 40 are positioned on flat or relatively flat surfaces, while IR window 42 is positioned on a cylindrically curved surface.

By trying to hide the optical sensor, such IR windows effectively act as the first element of a lens system for such an IR imaging system. Typically, an IR window hides the IR camera from users by applying some combination of an infrared-anti-reflective coating (IR-AR), an IR transparent/ visible light blocking polymer substrate (e.g., acrylic, polycarbonate) and an AR coating that reduces optical reflectivity for at least the IR wavelengths, positioned on an opposing side from the IR-AR coating. By making use of a broadband AR coating as the AR coating on the substrate side facing the user, the IR window may be made to appear dark, or substantially black. Such optical stacks may achieve high IR transmission (e.g., >98%) while appearing to the user as a dark window.

However, the appearance of a dark window may not be aesthetically pleasing to the user, unless the surrounding surfaces of the device itself are dark or black. As an alternative, an IR window may include a dichroic coating that reflects visible light and transmits IR light, giving the IR window a mirrored appearance that may be neutral in color, or may include some hue. Much like the dark window, a mirrored window may not be desirable for devices that are not otherwise specularly reflective.

In contrast, a brighter, more diffusely-reflective IR window may allow for more advanced design choices that match or enhance the appearance of the outer surface of the rest of the device. However, positioning an optical sensor behind a diffuser is generally considered to be incompatible with imaging applications, as transmitted light may become blurred and unrecognizable. Placing a bumpy or matte surface between the imaging system and objects within the scene being imaged, such as against an intermediate interface, may adversely impact the modulation transfer function (MTF) of the imaging system. Further, any effect added on top of a structured light pattern will lower the performance and efficiency of the imaging system, potentially losing z-distance accuracy, dynamic range, etc. Additionally, for any given software algorithm, neural network, or detection scheme, any blur added on top of an image may both degrade the MTF and contribute to a reduction of the maximum z distance at which the imaging system can perceive objects in an ambient scene.

Additionally, for High Dynamic Range (HDR) imaging applications that use on-board illumination, it may be helpful to reduce reflectance of all lens element surfaces to levels lower than for typical imaging in order to reduce ghosting and flare. Partially-reflective metal coatings can reflect ambient light and act to pseudo-hide the optical sensor, but this hiding ability is dependent on the geometry of the use environment and the position of the users relative to the device. Further, the efficiency of imaging systems imparting such coatings is negatively impacted, necessitating increased output light intensity and thus increasing the incidence of ghosting and flare.

For certain devices, such as digital home assistant 32 and user input system 24, it is desirable for the user to take advantage of both machine vision and audio (input and output) features. As such, the device may need to accurately capture optical data at a range of distances, from as near to the device as 0.3 meters to as far from the device as 7 meters. For a given exposure setting (e.g., gain and exposure time) the optical sensor needs to receive enough light for objects at the far end of the exposure setting without saturating near optics. As the capture distance increases, so does the amount of light needed to generate accurate measurements. This makes it challenging to maximize signal to noise ratio for HDR imaging, where multiple levels of dynamic range are used for one snapshot setting. As an example, for HDR imaging with two subframes, including a first subframe to capture a near distance range and a second subframe to capture a far distance range, the second subframe requires more light to discern objects, but if there is also an object in the first subframe, the return will be saturated. Note that the number of HDR subframes may include more than 2, or may be adjusted as needed to support a given z capture range, based on a dynamic range of each subframe with appropriate exposure scheme and/or settings, as long as any angular resolution requirements for a given object scene are met.

This generates a need for an optical stack that allows high efficiency light transmission while simultaneously reducing ghosting and flares. Any optical coatings thus need to have very low reflectance. For example, if used in an outdoor application, (e.g., drones, vehicles) the potential for glare is high. As such, the transmission of the IR-window needs to be high while maintaining the MTF, high resolution, and high contrast.

Herein, various examples are provided for an optical stack that provides wavelength-selective filtering by employing a bumpy, diffuse surface embedded between two index matched layers which overlay an optical sensor. This reduces the impact of the optical stack on MTF and transmission efficiency, while also diffusely reflecting ambient light towards the user via the bumpy, diffuse surface. This enables the optical sensor to be hidden using ambient light, while maintaining or enhancing the performance of an IR machine vision system.

Figure 2:
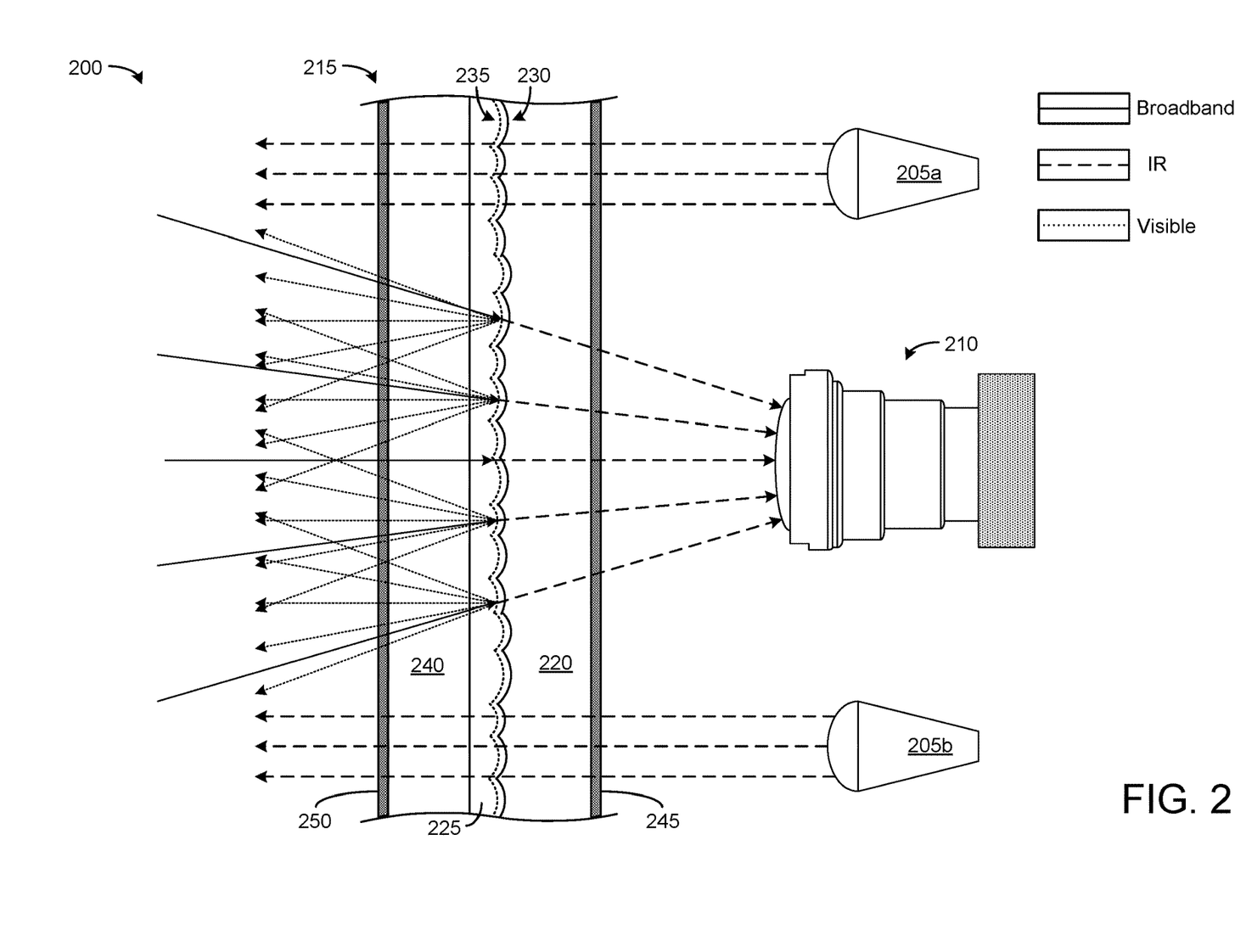
FIG. 2 schematically shows an example optical system including a selectively transmissive optical stack.

FIG. 2 schematically depicts an example optical system 200. For example, optical system may be a depth camera, IR scanner, thermal imager, or other IR sensitive imager. While described particularly in the context of IR optics, optical system 200 may alternatively be a narrow-band visible light camera, near-IR sensitive imager, UV sensitive imager, etc.

Optical system 200 includes optical sources 205a and 205b. Optical sources 205a and 205b are configured to emit light within one or more bandwidths of interest. The emitted light may include structured illumination lighting and/or uniform lighting. While two optical sources are shown, one optical source, or three or more optical sources may be included. In some examples, optical sources may be omitted from optical system 200, or may be positioned apart from other components of optical system 200, as described further herein. Optical sources 205a and 205b may emit light within the same bandwidth or bandwidths of interest, different bandwidths, and/or overlapping bandwidths. In some examples, optical sources 205a and 205b may emit light with the same or similar intensities. For structured light examples, optical sources 205a and 205b may emit light with identical patterns, or with different patterns or structures, so that their combined emissions form a single recognizable light structure. In some examples, optical sources 205a and 205b may emit a flood light that provides substantially uniform light across a field of illumination (FOI), that may be designed to meet or exceed the camera system field of view (FOV). The emitted light may be pulsed or 'flashed' in sync with camera exposures to improve efficiency of the usage of the light source.

Optical system 200 further includes optical sensor 210. Optical sensor 210 may be configured to receive light within the bandwidth(s) of interest, e.g., configured to receive light emitted by optical sources 205a and 205b. Although one optical sensor is depicted, in some examples optical system 200 may include two or more optical sensors.

Optical system 200 further includes optical stack 215. As depicted, optical stack 215 is placed optically in front of optical sensor 210. Herein, a first component of optical system depicted as being to the left of a second component may be referred to as being "optically in front of" the second component, while the second component may be referred to as being "optically behind" the second component. Optical sensor 210 may also be considered to be on the interior of optical system 200, while light and other components on the opposite side of optical stack 215 may be considered to be exterior to optical system 200.

Optical stack 215 may be considered to be an example of the IR-windows described with regard to FIG. 1. As such, optical stack 215 may hide or cover optical sensor 210 when viewed from the exterior side. Accordingly, all, or nearly all of the light received at optical sensor 210 from the environment external to optical system 200 may pass through optical stack 215.

As depicted, optical sources 205a and 205b are configured to emit light to the environment through optical stack 215. However, in other examples, optical sources 205a and 205b may be located elsewhere within optical system 200. In such examples, optical sources 205a and 205b may emit light via a similar optical stack, or via a different optical stack. For example, optical sources 205a and 205b may emit IR light centered around 850 nm, 940 nm, etc. At 850 nm, IR light retains some visibility, and optical sources 205a and 205b may be placed behind an optical stack that accounts for this, such as by including one or more additional absorbance layers. At 940 nm, IR light is substantially not visible, and thus may be placed behind an optical stack that is more permissive. In examples where optical sources 205a and 205b emit light through optical stack 215, and where optical sensor 210 receives light transmitted through optical stack 215, additional opaque structures may separate optical sensor 210 from optical sources 205a and 205b, so that light emitted by optical sources 205a and 205b is not able to be received at optical sensor 210 without first passing through optical stack 215, reflecting off of objects exterior to optical system 200, and passing back through optical stack 215.

Optical stack 215 includes polymeric layer 220, matching index layer 225, and bumpy diffuse surface 230 embedded between polymeric layer 220 and matching index layer 225. Polymeric layer 220 has a refractive index of $n_1$, and may be configured to be optically transparent to at least the bandwidth(s) of interest.

Matching index layer 225 is depicted as being positioned optically in front of polymeric layer 220. Matching index layer 225 may be configured to have a refractive index of $n_2$, with $n_2$ being equal to, or within a threshold similarity of, $n_1$. In this way, light traversing both polymeric layer 220 and matching index layer 225 is not subject to significant refraction. Matching index layer 225 may be a filler adhesive applied to bumpy diffuse surface 230, thereby filling the relief of bumpy diffuse surface 230 and generate a relatively smooth surface. In this way, matching index layer 225 may reduce or prevent MTF and contrast loss. For example, matching index layer 225 may be an optically clear adhesive (OCA), optically clear resin (OCR), or other suitable material that both fills the relief of bumpy diffuse surface 230 and matches the refractive index of polymeric layer 220 to within a threshold similarity.

Partially reflective layer 235 may be positioned in between bumpy diffuse surface 230 and matching index layer 225. Partially reflective layer 235 may be configured to at least partially reflect at least some wavelengths outside the one or more bandwidths of interest. Partially reflective layer 235 may further be configured to at least partially transmit wavelengths within the one or more bandwidths of interest.

Partially reflective layer 235 may be a dichroic layer, dichroic coating, sputtered metal, or other interference based optical filter that is applied to bumpy diffuse surface 230. As an example, partially reflective layer 235 may be a broadband vapor metal coating layer. Such a coating layer may be configured as a 50% partially reflective layer that diffusely reflects 50% of light having wavelengths outside the one or more bandwidths of interest and transmits 50% of light having wavelengths within the one or more bandwidths of interest. For example, a 50% partially reflective broadband vapor metal coating layer may reflect 50% of visible light and transmit 50% of IR light.

Partially reflective layer 235 may be configured as a wavelength-selective layer that may be optically transparent to at least the bandwidth(s) of interest. Such a wavelength-selective layer may be configured to reflect at least some wavelengths outside of the bandwidth(s) of interest. For example, partially reflective layer 235 may comprise a multi-layer dielectric stacked polymer film having stepped indices. Additionally or alternatively, partially reflective layer 235 may include a Rugate coating having a smoothly variable change in index across layers (e.g., analog index vs stepped index). In examples where the optical coating layers of partially reflective layer 235 are more compliant, such as for layers of polymers rather than layers of metal oxides, partially reflective layer 235 may be surface molded to generate a bumpy profile, and then laminated to adjacent layers of optical stack 215. In some examples, partially reflective layer 235 may be a holographic layer.

Optically transparent polymer cap 240 may be positioned optically in front of matching index layer 225. In some examples, optically transparent polymer cap 240 may be transparent to at least the bandwidth(s) of interest, but may be visibly tinted. Bumpy diffuse surface 230 may be formed on polymeric layer 220, however, in other examples, bumpy diffuse surface 230 may be formed on the optically transparent polymer cap 240. In some examples, bumpy diffuse surface 230 may be replicated on polymeric layer 220, such as by UV-replication or UV-casting. In such examples, matching index layer 225 may include the same UV-cure adhesive used to replicate bumpy diffuse surface 230. One or both of polymeric layer 220 and optically transparent polymer cap 240 may comprise other optical media including glass, etc., such as the front glass of a touch display module (TDM) in a tablet computer.

Bumpy diffuse surface 230 may be configured such that light within the bandwidth(s) of interest does not refract when traversing the bumpy surface. While this bumpy surface is embedded between polymeric layer 220 and matching index layer 225, the outer surfaces of optical stack 215 may be specularly smooth. As an example, polymeric layer 220 may be molded so that the outer face is specularly smooth and the inner face is bumpy. Bumpy diffuse surface 230 may then be coated with partially reflective layer 235, and then laminated to optically transparent polymer cap 240 via matching index layer 225. In this way, optical stack 215 is specularly smooth on both exterior sides, but has an embedded bumpy diffuse surface 230.

As described with regard to FIG. 1, optical stack 215 may be utilized as an IR window for a machine vision system. In such examples, optical sources 205a and 205b may emit infrared light, such as infrared light centered around 850 nm, centered around 940 nm, or centered around any another suitable wavelength. Optical sensor 210 may thus be configured to receive light within a threshold wavelength of the light emitted by optical sources 205a and 205b. Optical stack 215 may be configured to transmit infrared light (e.g., light within a threshold wavelength of the light emitted by optical sources 205a and 205b) and to absorb and/or reflect visible light.

Optical stack 215 may include anti-reflective coatings on both the exterior face and the interior face. Such anti-reflective coatings may be broadband and/or narrowpass around the desired bandwidth(s). For example, optical stack 215 may include anti-reflective coating 245 on a surface of polymeric layer 220 facing optical sensor 210. Anti-reflective coating 245 may thus generate a specularly flat face of optical stack 215. Anti-reflective coating 245 may be an infrared anti-reflective coating. Alternatively, anti-reflective coating 245 may be a broadband anti-reflective (BBAR) or other suitable coating having high IR transmission. In examples wherein polymeric layer 220 absorbs visible light, low reflectivity across the visible range at anti-reflective coating 245 would have minimal effect on the external appearance of optical stack 215. In such examples, selection of the coating type and response may be based on material cost, manipulability, etc. so long as high transmission of the IR band is maintained.

Optical stack 215 may further include anti-reflective coating 250, positioned optically in front of optically transparent polymer cap 240. The exterior surface of anti-reflective coating 250 may be specularly smooth. Anti-reflective coating 250 may be an IR-AR coating, a broadband anti-reflective (BBAR) coating, or other suitable coating that maintains high transmission of IR light through optical stack 215. An optically transparent hard coat may be layered on the exterior face of anti-reflective coating 250.

Polymeric layer 220 may be configured to absorb at least some wavelengths outside the bandwidth(s) of interest. For example, polymeric layer 220 may absorb wavelengths in the visible range and may transmit wavelengths in the infrared range. Polymeric layer 220 may include near IR acrylic filters, PET-based resins, polymer sheets, polycarbonate, or other suitable materials. In some examples, one or more dyes that absorb light in the visible range and allow high transmission in the IR range may be compounded into polymeric layer 220. Polymeric layer 220 may thus be a clear or tinted polymer cover or adhesive cap for optical stack 215.

Partially reflective layer 235 may be configured to reflect wavelengths in the visible range, and to transmit wavelengths in the infrared range. Bumpy diffuse surface 230 and partially reflective layer 235 may thus enable optical stack 215 to diffusely-reflect visible ambient light and enable high Transmission for IR illumination wavelengths. As shown in FIG. 2, optical sources 205a and 205b may emit IR light (dashed lines), which passed through optical stack 215. Broadband light (solid lines) may pass through optically transparent polymer cap 240. Upon reaching partially reflective layer 235, visible light (dotted lines) is diffusely reflected, while IR light is transmitted back to optical sensor 210. Because the refractive index $n_2$ of matching index layer 225 is within a threshold similarity of the refractive index $n_1$ of polymeric layer 220, the IR light is transmitted through optical stack 215 without scatter, and without refracting.

Partially reflective layer 235 and bumpy diffuse surface 230 may determine the appearance of optical stack 215 when viewed from the external side. Bumpy diffuse surface 230 may be configured such that the angle of scatter is greater than or equal to the critical angle for optical stack 215. Thus, light may escape bumpy diffuse surface 230 at various angles, up to and including a 90-degree angle. Bumpy diffuse surface 230 may have a full-width half maximum (FWHM) diffusion angle, in air, of between 13 and 26 degrees, though the FWHM diffusion angle may be greater or lesser in some examples. When paired with partially reflective layer 235, visible light (e.g., visible components of ambient light) may thus be diffusely reflected. As bumpy diffuse surface 230 is embedded with matching index layer 225 and partially reflective layer 235, the combination of a diffuse reflective in-media angular spread and refraction at the exit surface may generate a substantially higher diffusion angle than for bumpy diffuse surface 230 in air alone.

Such scatter angles and FWHM diffusion angles may lend optical stack 215 an external appearance that is both diffuse and matte at all angles when bumpy diffuse surface 230 is configured as a random diffuser. In other examples, bumpy diffuse surface 230 may be an ordered microlens array, a randomized microlens array, a prismatic diffuser (forms a diffusely-reflective bias angle), a step-and-repeat patterned diffuser, a gradient diffuser, a pseudo-random bumpy surface, etc.

The type and characteristics (e.g. surface angles) of bumpy diffuse surface 230 may be selected in order to generate a desired intensity distribution and a desired outward appearance. For example, a repeated or pseudo-repeated structure may be used to generate an outward appearance that looks like fabric, chain mesh, a woven structure, etc. A papered look may be generated based on the size of the scatter centers (e.g., <40 µm), average spacing of scatter centers, etc. A curvy or prismatic surface may be combined with random bumpiness to generate a brushed or etched look. Further, since the dichroic coating response typically blue-shifts with an increased angle of incidence (AOI), a limited surface gradient may be combined with a dichroic spectral response profile to achieve hue or brightness shifts in appearance versus view angle. For example, a conical or cylindrical shaped device window may be fabricated to appear to have a brighter matte appearance on axis, and a roll-off and/or shift hue with a higher view angle (e.g., off to the sides). This effect may be consistent from the vantage point of the user, and may be described as having a sheen or velvet appearance, and may have such an appearance from various view angles.

Partially reflective layer 235 may be narrow enough so as not to significantly impact the refractive properties of matching index layer 225 and polymeric layer 220. In this way, wavelengths that reflect off the coating are diffusely reflected, and wavelengths that transmit through the coating do so without scatter. As described, partially reflective layer 235 may be a wavelength selective coating that efficiently reflects most or all of the visible light, and reflects little to none of the IR light. In some examples, partially reflective layer 235 may be wavelength-selective reflective, thus enabling optical stack 215 to attain a variety of outward appearing colors. Wavelength-selective layers that are more highly reflective may enable brighter appearances.

The wavelength response of partially reflective layer 235 may be combined with the absorption properties of polymeric layer 220. Altogether, optical stack 215 may thus undergo transitions where volume scattering is minimally dependent on wavelength. Thus, IR light may be efficiently, specularly transmitted through optical stack 215 with minimal scattering, as scattering will occur only for visible wavelengths at a surface interface, but not any wavelengths at a volume interface. Thus minimal scattering may occur within the volume or bulk of the various optical media layers within the stack.

Figure 3:
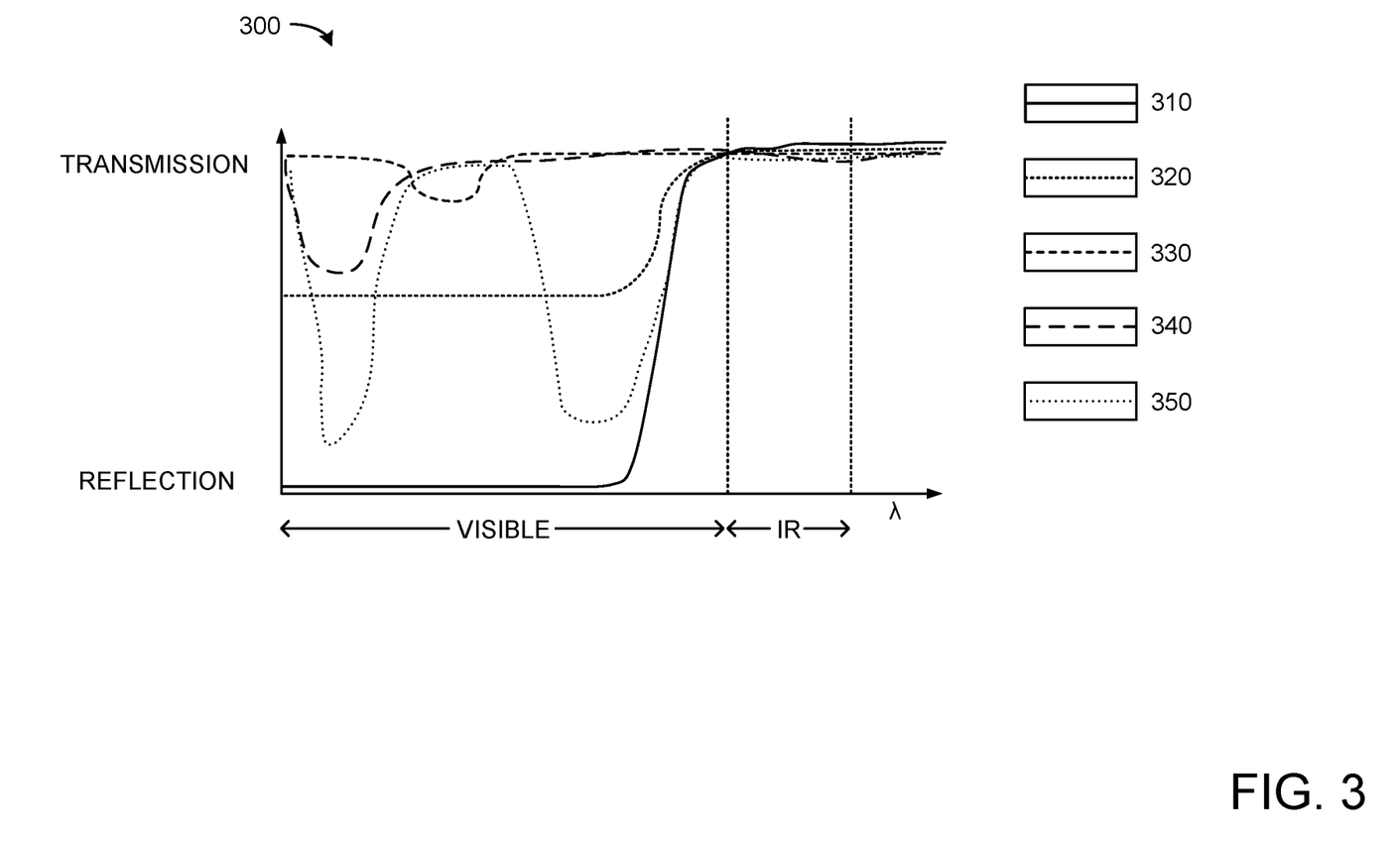
FIG. 3 is a graph depicting relative transmission and reflection properties of example wavelength-selective layers.

Some optical properties of non-limiting example wavelength-selective layers are shown in FIG. 3. FIG. 3 shows a graph 300 depicting relative transmission and reflection properties of example wavelength-selective layers across the visible and IR wavelength spectrums. Plot 310 represents a wavelength-selective layer that appears to be bright white when viewed externally. Such a wavelength-selective layer is fully reflective of short visible light wavelengths and fully transmissive of all IR wavelengths, while undergoing a transition in near-IR wavelengths.

Plot 320 represents a wavelength-selective layer that appears to be dimmed grey when viewed externally. Such a wavelength-selective layer is partially (e.g., 50%) reflective across the visible spectrum, and fully transmissive of all IR wavelengths.

Plot 330 represents a wavelength-selective layer that appears to be dark green when viewed externally. Such a wavelength-selective layer is fully transmissive, excepting for partial reflectivity in the green wavelengths of the visible spectrum.

Plot 340 represents a wavelength-selective layer that appears to be moderate blue when viewed externally. Such a wavelength-selective layer is partially reflective in the blue/violet wavelengths of the visible spectrum and fully transmissive in longer wavelengths, including the IR wavelengths.

Plot 350 represents a wavelength-selective layer that appears to be bright purple when viewed externally. Such a wavelength-selective layer is partially reflective in the blue/violet and red wavelengths, and fully transmissive in the orange/yellow/green and IR wavelengths.

For examples using coatings that are partially-reflective across the visible range, polymeric layer 220 may be selected to include visible light absorbing dye in order to ensure that optical stack 215 is not see-through. Alternatively, polymeric layer 220 may be selected to be clear or partially transparent across the visible range in order to provide a partially translucent appearance.

Optical stack 215 may be considered to be a flat optical stack. As such, optical stack 215 may be applicable to devices where the optical system is deposed behind a flat panel, such as laptop computing system 30. For devices where the optical system is deposed behind a curved panel, such as for digital home assistant 32, a curved optical stack may be employed.

Figure 4:
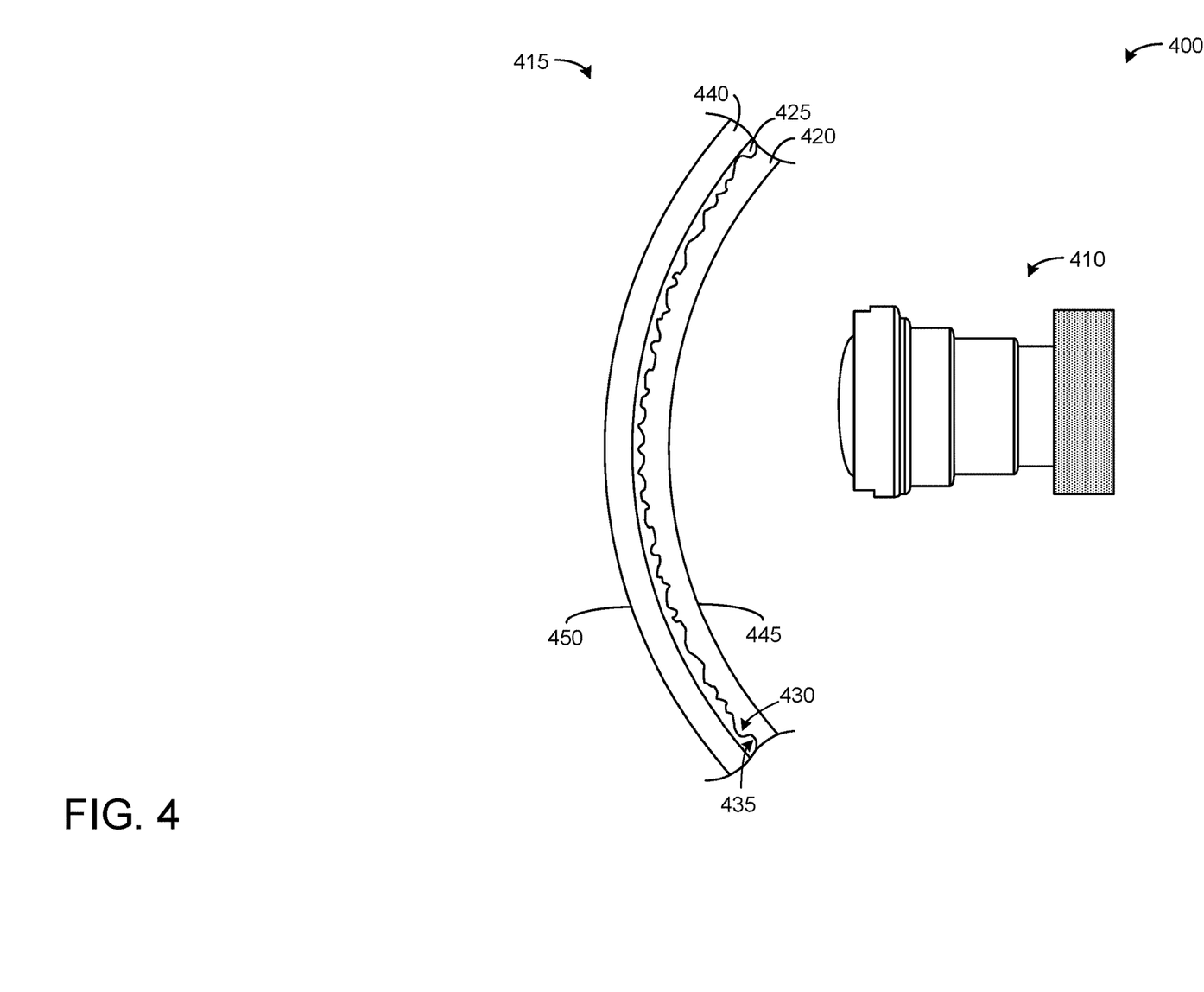
FIG. 4 schematically shows an example optical system including a curved selectively transmissive optical stack.

FIG. 4 shows an example optical system 400 that includes an optical sensor 410 and a curved optical stack 415. Optical system 400 may further include one or more optical sources (not shown). Curved optical stack 415 may be cylindrically curved, conically curved, spherically curved, or may have any other suitable curvature.

Optical stack 415 includes polymeric layer 420, matching index layer 425, and bumpy diffuse surface 430 embedded between polymeric layer 420 and matching index layer 425. Partially reflective layer 435 may be positioned in between bumpy diffuse surface 430 and matching index layer 425.

Optically transparent polymer cap 440 may be positioned optically in front of matching index layer 425. Optical stack 415 may include infrared anti-reflective coating 445 on a surface of polymeric layer 420 facing optical sensor 410, and may further include anti-reflective coating 450, positioned optically in front of optically transparent polymer cap 440.

Properties of optical stack 415 and its components may include any and all properties of the corresponding components of optical stack 215, excepting that components towards the interior side of optical stack 415 may be molded and/or curved so as to fit concentrically within components placed toward the external side of optical stack 415.

Both optical stack 215 and optical stack 415 may be fabricated in any suitable manner. For example, two or more components of the optical stacks may be fabricated as a film, then laminated to other components. In some examples, the bumpy diffuse surface may be generated via UV curable casting on a substrate (e.g., polymeric layer), with the partially reflective layers then disposed on the generated bumpy diffuse surface. In other examples, the bumpy diffuse surface may be molded as a homogenate of the substrate layer itself. As another example, the bumpy diffuse surface and/or partially reflective layers may be disposed onto a flat sheet. To generate a curved optical stack, the coated flat sheet may be bent into a curved sheet, inserted into a molded polymer cap, then either optically clear resin (OCR) injected in between the layers as the matching index fill layer, or optically clear adhesive (OCA) used to laminate the layers together while acting as the matching index fill layer.

In some examples, fabricating a curved optical stack may present additional challenges. For example, applying IR-AR coating to a fully curved optical stack within a molded shaped cap may not be feasible, based on the curvature of the stack at the interior face of the polymeric layer. As such, a curved optical stack may include a larger, exterior, primary optic window, and a smaller, interior, secondary optic window. The smaller, secondary optic window may be fabricated separately, then laminated to the primary window to generate the curved optical stack. In this way, manufacturing complexity of the optical stack may be reduced.

Figure 5:
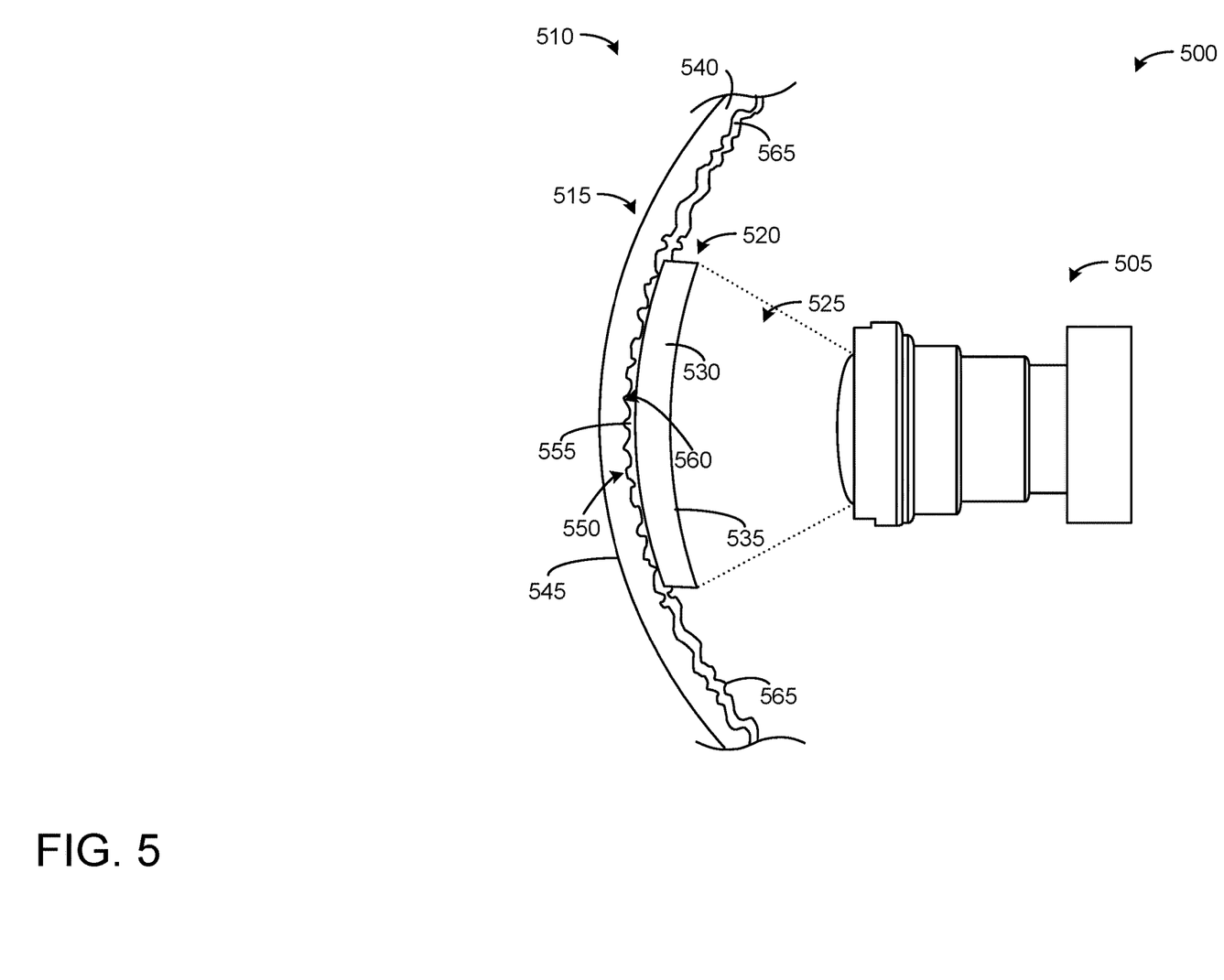
FIGS. 5 and 6 schematically show example optical systems including a curved selectively transmissive optical stack having a secondary optic window.

FIG. 5 schematically shows an example optical system 500. Optical system 500 includes optical sensor 505 and a curved optical stack 510. Optical system 500 may further include one or more optical sources (not shown). Optical sensor 505 may be located on an interior of optical system 500 and may be configured to receive light within one or more bandwidths of interest.

Curved optical stack 510 may be selectively transmissive to the bandwidth(s) of interest, and may be cylindrically curved, conically curved, spherically curved, or may have any other suitable curvature.

Curved optical stack 510 may be placed optically in front of optical sensor 505. Curved optical stack 510 may include primary optic window 515 and secondary optic window 520. Secondary optic window 520 may interface with a portion of an interior side of primary optic window 515, secondary optic window 520 having a smaller radius than primary optic window 515 and matching the curvature of primary optic window 515.

Secondary optic window 520 may be sized to match the purview 525 of optical sensor 505. As such, all light reaching optical sensor 505 may pass through both primary optic window 515 and secondary optic window 520. Secondary optic window 520 may include a polymeric layer 530 configured to be optically transparent to at least the bandwidth(s) of interest. Secondary optic window 520 may further include an IR-AR coating 535 on an interior surface of polymeric layer 530. In this example, secondary optic window 520 has a constant thickness and is specularly smooth on both interior and exterior faces.

Primary optic window 515 may include optically transparent polymer cap 540. An anti-reflection coating 545 may be included on an exterior face of optically transparent polymer cap 540. In some examples an optically transparent hard coat may be included on an exterior face of anti-reflection coating 545. The exterior face of primary optic window 515 may be specularly smooth.

In this example, a bumpy diffuse surface 550 is formed on an interior surface of optically transparent polymer cap 540. Bumpy diffuse surface 550 is thus embedded between primary optic window 515 and secondary optic window 520. A matching index layer 555, having a refractive index within a threshold similarity of that of polymeric layer 530 is positioned between polymeric layer 530 and optically transparent polymer cap 540. Matching index layer 555 may thus bind primary optic window 515 and secondary optic window 520 and fill in the relief of bumpy diffuse surface 550.

Partially reflective layer 560 may be positioned in between bumpy diffuse surface 550 and matching index layer 555. Partially reflective layer 560 may be configured to at least partially reflect at least some wavelengths outside the one or more bandwidths of interest. In some examples, partially reflective layer 560 may be configured as a wavelength-selective layer, and thus configured to be optically transparent to at least the bandwidth(s) of interest, and further configured to reflect at least some wavelengths outside the bandwidth(s) of interest. In some examples, partially reflective layer 560 may be applied to the entirety of bumpy diffuse surface 550 (e.g., the entirety of the interior surface of optically transparent polymer cap 540. In other examples, partially reflective layer 560 may be applied only to portions of bumpy diffuse surface 550 within purview 525.

In some examples, an opaque coating 565 may be applied to portions of the interior surface of optically transparent polymer cap 540 that extend beyond secondary optic window 520 and are thus outside the purview 525 of optical sensor 505. For example, a black paint or screened ink may be applied to prevent light from reaching optical sensor 505 without passing through secondary optic window 520. Opaque coating 565 may also improve the consistency of appearance for examples wherein partially reflective layer 560 includes a coating that is partially reflective across the entire visible range.

Alternatively, the bumpy diffuse surface may be formed on the secondary optic window, thus reducing the surface needed to be coated with a partially reflective layer. As the partially reflective layer (e.g., dichroic layer) is often the most expensive portion of the optical stack, this may reduce manufacturing costs.

Figure 6:
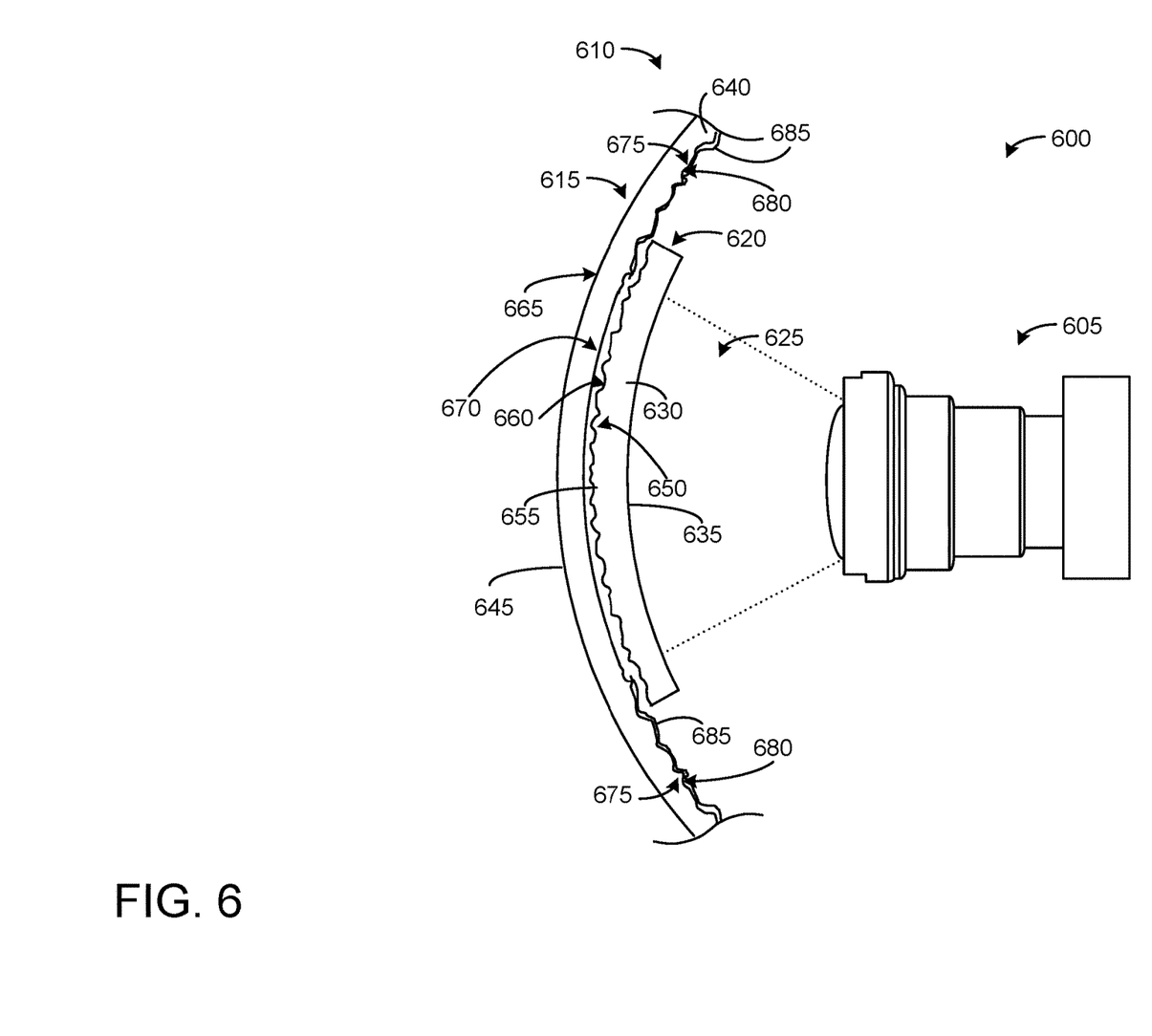

FIG. 6 schematically shows such an example optical system 600. Optical system 600 includes optical sensor 605 and a curved optical stack 610. Optical system 600 may further include one or more optical sources (not shown). Curved optical stack 610 may be placed optically in front of optical sensor 605. Curved optical stack 610 may include primary optic window 615 and secondary optic window 620.

Secondary optic window 620 may be sized to match the purview 625 of optical sensor 605. Secondary optic window 620 may include a polymeric layer 630 configured to be optically transparent to at least one or more bandwidth(s) of interest. Secondary optic window 620 may further include an IR-AR coating 635 on an interior surface of polymeric layer 630. In this example, secondary optic window 620 is specularly smooth on an exterior face.

Primary optic window 615 may include optically transparent polymer cap 640. An anti-reflection coating 645 may be included on and/or under an exterior face of optically transparent polymer cap 640. In some examples an optically transparent hard coat may be included on an exterior face of anti-reflection coating 645. Both the interior and exterior faces of primary optic window 615 may be specularly smooth.

In this example, a bumpy diffuse surface 650 is formed on an exterior surface of polymeric layer 630. Bumpy diffuse surface 650 is thus embedded between primary optic window 615 and secondary optic window 620. A matching index layer 655, having a refractive index within a threshold similarity of that of polymeric layer 630 is positioned between polymeric layer 630 and optically transparent polymer cap 640. Matching index layer 655 may thus bind primary optic window 615 and secondary optic window 620 and fill in the relief of bumpy diffuse surface 650.

Using secondary optic window 620 in this way allows for a curved profile to be generated at outer portions of primary optic window 615. For cylindrical applications, the shape near the top and bottom of primary optic window 615 would not be constrained by a radially-curved flat sheet.

Partially reflective layer 660 may be positioned in between bumpy diffuse surface 650 and matching index layer 655. Partially reflective layer 660 may be configured to at least partially reflect at least some wavelengths outside the one or more bandwidths of interest. In some examples, partially reflective layer 660 may be configured as a wavelength-selective layer, and thus configured to be optically transparent to at least the bandwidth(s) of interest, and further configured to reflect at least some wavelengths outside the bandwidth(s) of interest.

In this example, optically transparent polymer cap 640 includes a specularly smooth exterior surface 665. An interior surface of optically transparent polymer cap 640 includes an inner specularly smooth region 670 that extends to purview 625 of optical sensor 605. Outer bumpy surfaces 675 flank inner specularly smooth region 670. In some examples, outer bumpy surfaces 675 may be covered by a dichroic coating 680. Dichroic coating 680 may include the same material used for partially reflective layer 660. Inner specularly smooth region 670 may be uncoated.

Additionally or alternatively, an opaque coating 685 may be applied to outer bumpy surfaces 675, and thus to regions of primary optic window 615 outside the purview 625 of optical sensor 605. In some examples, dichroic coating 680 may instead be a metallized coating, such as a vapor metal coating (e.g., physical vapor deposition coating). Such a metallized coating may be color matched to partially reflective layer 660 to generate a continuous external appearance. In such examples, opaque coating 685 may be applied over the vapor metal coating so as to absorb or block light as needed for cases where the vapor metal coating (e.g., substitution for dichroic coating 680) is partially transmissive across and/or in part of the visible range of wavelengths, in order to achieve acceptable color matching appearance between purview 625 and the non-purview region(s).

An average reflectance of partially reflective layer 660 may be selected to match an effective coloration and reflectance of opaque coating 685 in order to match appearances. Although partially reflective layer 660 may have waviness across the visible spectrum, and thus may have slight coloration vs view angle dependence, the close-packed scatter centers serve to mix this light range such that an external viewer effectively sees an average coloration. As such, an average reflectance of partially reflective layer 660 may be within a threshold of the effective reflectance of the opaque coating 685. The opaque coating may be masked so as to form an abrupt transition, but a smooth fully-reflective to partially-reflective taper may be used over the edges of secondary optic window 620 in order to further minimize appearance of any transition.

In one example, an optical system, comprises an optical sensor configured to receive light within one or more bandwidths of interest; and an optical stack placed optically in front of the optical sensor, the optical stack comprising: a polymeric layer configured to be optically transparent to at least the one or more bandwidths of interest; a matching index layer positioned optically in front of the polymeric layer, the matching index layer and polymeric layer having refractive indexes within a threshold similarity; a bumpy diffuse surface embedded between the polymeric layer and the matching index layer; and a partially reflective layer positioned in between the bumpy diffuse surface and the matching index layer, the partially reflective layer configured to at least partially reflect at least some wavelengths outside the one or more bandwidths of interest. In such an example, or any other example, the optical system may additionally or alternatively comprise an infrared anti-reflective coating on a surface of the polymeric layer facing the optical sensor. In any of the preceding examples, or any other example, the optical system may additionally or alternatively comprise an optically transparent polymer cap positioned optically in front of the matching index layer. In any of the preceding examples, or any other example, the bumpy diffuse surface may additionally or alternatively be formed on the optically transparent polymer cap. In any of the preceding examples, or any other example, the optical system may additionally or alternatively comprise an anti-reflective coating optically in front of the optically transparent polymer cap. In any of the preceding examples, or any other example, the anti-reflective coating may additionally or alternatively comprise an infrared anti-reflective coating. In any of the preceding examples, or any other example, the anti-reflective coating may additionally or alternatively comprise a broadband anti-reflective coating. In any of the preceding examples, or any other example, the partially reflective layer may be a wavelength-selective layer configured to be optically transparent to at least the one or more bandwidths of interest, and to reflect at least some wavelengths outside the one or more bandwidths of interest. In any of the preceding examples, or any other example, the wavelength-selective layer may additionally or alternatively be configured to reflect visible wavelengths and transmits infrared wavelengths. In any of the preceding examples, or any other example, the polymeric layer may additionally or alternatively be configured to absorb at least some wavelengths outside the one or more bandwidths of interest. In any of the preceding examples, or any other example, the polymeric layer may additionally or alternatively be configured to absorb visible wavelengths and transmits infrared wavelengths. In any of the preceding examples, or any other example, the bumpy diffuse surface may additionally or alternatively be on the polymeric layer. In any of the preceding examples, or any other example, the optical stack may additionally or alternatively comprise a curved optical stack.

In another example, an optical system comprises an optical sensor located on an interior of the optical system, and configured to receive light within one or more bandwidths of interest; and an optical stack placed optically in front of the optical sensor, the optical stack comprising: a primary optic window including an optically transparent polymer cap; a secondary optic window, interfacing with a portion of an interior side of the primary optic window, the secondary optic window having a smaller radius than the primary optic window and matching a curvature of the primary optic window, and including a polymeric layer configured to be optically transparent to at least the one or more bandwidths of interest; a matching index layer positioned between the polymeric layer and the optically transparent polymer cap, the matching index layer and polymeric layer having refractive indexes within a threshold similarity; a bumpy diffuse surface embedded between the primary optic window and the secondary optic window; and a partially reflective layer positioned in between the bumpy diffuse surface and the matching index layer, the partially reflective layer configured to at least partially reflect at least some wavelengths outside the one or more bandwidths of interest. In such an example, or any other example, the bumpy diffuse surface may additionally or alternatively be included on a surface of the secondary optic window. In any of the preceding examples, or any other example, the bumpy diffuse surface may additionally or alternatively be included on a surface of the primary optic window. In any of the preceding examples, or any other example, the optical system may additionally or alternatively comprise an opaque coating on portions of an interior surface of the primary optic window that extend beyond the secondary optic window. In any of the preceding examples, or any other example, the optical system may additionally or alternatively comprise a vapor metal layer on portions of an interior surface of the primary optic window that extend beyond the secondary optic window. In any of the preceding examples, or any other example, an average reflectance of the partially reflective layer may additionally or alternatively be within a threshold of an effective reflectance of the vapor metal layer.

In yet another example, an optical system comprises one or more optical sources configured to emit infrared light; an optical sensor configured to receive infrared light; and an optical stack placed optically in front of at least the optical sensor, the optical stack comprising: a polymeric layer configured to be optically transparent to at least infrared light; an infrared anti-reflective coating on a surface of the polymeric layer facing the optical sensor; a matching index layer positioned optically in front of the polymeric layer, the matching index layer and polymeric layer having refractive indexes within a threshold similarity; an optically transparent polymer cap positioned optically in front of the matching index layer; an anti-reflective coating optically in front of the optically transparent polymer cap; a bumpy diffuse surface embedded between the polymeric layer and the matching index layer; and a partially reflective layer positioned in between the bumpy diffuse surface and the matching index layer, the partially reflective layer configured to partially reflect at least some at least some visible light wavelengths.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical system, comprising:
an optical sensor configured to receive light within one or more bandwidths of interest; and
an optical stack placed optically in front of the optical sensor, the optical stack comprising:
a primary optic window including an optically transparent polymer cap;
a secondary optic window, interfacing with a portion of an interior side of the primary optic window, the secondary optic window having a smaller radius than the primary optic window and matching a curvature of the primary optic window, and including a polymeric layer configured to be optically transparent to at least the one or more bandwidths of interest;
a matching index layer positioned between the polymeric layer and the optically transparent polymer cap, the matching index layer and polymeric layer having refractive indexes within a threshold similarity;
a bumpy diffuse surface embedded between the primary optic window and the secondary optic window; and
a partially reflective layer positioned in between the bumpy diffuse surface and the matching index layer, the partially reflective layer configured to at least partially reflect at least some wavelengths outside the one or more bandwidths of interest; and
an infrared anti-reflective coating on a surface of the polymeric layer facing the optical sensor.

2. The optical system of claim 1, wherein the bumpy diffuse surface is formed on the optically transparent polymer cap.

3. The optical system of claim 1, further comprising:
an anti-reflective coating optically in front of the optically transparent polymer cap.

4. The optical system of claim 3, wherein the anti-reflective coating comprises an infrared anti-reflective coating.

5. The optical system of claim 3, wherein the anti-reflective coating comprises a broadband anti-reflective coating.

6. The optical system of claim 1, wherein the partially reflective layer is a wavelength-selective layer configured to be optically transparent to at least the one or more bandwidths of interest, and to reflect at least some wavelengths outside the one or more bandwidths of interest.

7. The optical system of claim 6, wherein the wavelength-selective layer is configured to reflect visible wavelengths and transmit infrared wavelengths.

8. The optical system of claim 1, wherein the polymeric layer is configured to absorb at least some wavelengths outside the one or more bandwidths of interest.

9. The optical system of claim 8, wherein the polymeric layer is configured to absorb visible wavelengths and transmit infrared wavelengths.

10. The optical system of claim 1, wherein the bumpy diffuse surface is on the polymeric layer.

11. An optical system, comprising:
an optical sensor located on an interior of the optical system, and configured to receive light within one or more bandwidths of interest; and
an optical stack placed optically in front of the optical sensor, the optical stack comprising:
a primary optic window including an optically transparent polymer cap;
a secondary optic window, interfacing with a portion of an interior side of the primary optic window, the secondary optic window having a smaller radius than the primary optic window and matching a curvature of the primary optic window, and including a polymeric layer configured to be optically transparent to at least the one or more bandwidths of interest;
a matching index layer positioned between the polymeric layer and the optically transparent polymer cap, the matching index layer and polymeric layer having refractive indexes within a threshold similarity;
a bumpy diffuse surface embedded between the primary optic window and the secondary optic window; and
a partially reflective layer positioned in between the bumpy diffuse surface and the matching index layer, the partially reflective layer configured to at least partially reflect at least some wavelengths outside the one or more bandwidths of interest.

12. The optical system of claim 11, wherein the bumpy diffuse surface is included on a surface of the secondary optic window.

13. The optical system of claim 11, wherein the bumpy diffuse surface is included on a surface of the primary optic window.

14. The optical system of claim 11, further comprising a vapor metal layer on portions of an interior surface of the primary optic window that extend beyond the secondary optic window.

15. The optical system of claim 14, wherein an average reflectance of the partially reflective layer is within a threshold of an effective reflectance of the vapor metal layer.

16. The optical system of claim 14, further comprising an opaque coating on portions of the interior surface of the primary optic window that extend beyond the secondary optic window.

17. An optical system, comprising:
one or more optical sources configured to emit infrared light;
an optical sensor configured to receive infrared light; and
an optical stack placed optically in front of at least the optical sensor, the optical stack comprising:
a primary optic window including an optically transparent polymer cap;
a secondary optic window, interfacing with a portion of an interior side of the primary optic window, the secondary optic window having a smaller radius than the primary optic window and matching a curvature of the primary optic window, and including a polymeric layer configured to be optically transparent to at least infrared light;

an infrared anti-reflective coating on a surface of the polymeric layer facing the optical sensor;

a matching index layer positioned between the polymeric layer and the optically transparent polymer cap optically in front of the polymeric layer, the matching index layer and polymeric layer having refractive indexes within a threshold similarity;

an anti-reflective coating optically in front of the optically transparent polymer cap;

a bumpy diffuse surface embedded between the primary optic window and the secondary optic window; and a partially reflective layer positioned in between the bumpy diffuse surface and the matching index layer, the partially reflective layer configured to at least partially reflect at least some visible light wavelengths.

\* \* \* \* \*